(12) United States Patent
Savage (10) Patent No.: US 10,835,849 B2
(45) Date of Patent: Nov. 17, 2020

(54) SINUOUS PATH INERTIAL PARTICLE SEPARATOR SYSTEM AND METHOD

(71) Applicant: Lawrence Wayne Savage, Elkhart, IN (US)

(72) Inventor: Lawrence Wayne Savage, Elkhart, IN (US)

(73) Assignee: PARTICLE RECOVERY, LLC, Elkhart, IN (US)

( * ) Notice: Subject to any disclaimer, the term of this patent is extended or adjusted under 35 U.S.C. 154(b) by 188 days.

(21) Appl. No.: 16/020,895

(22) Filed: Jun. 27, 2018

(65) Prior Publication Data

US 2020/0001217 A1 Jan. 2, 2020

(51) Int. Cl.
| | |
|---|---|
| *B01D 45/00* | (2006.01) |
| *B01D 45/08* | (2006.01) |
| *B01D 46/10* | (2006.01) |
| *B01D 45/10* | (2006.01) |
| *B01D 45/16* | (2006.01) |
| *B05B 14/44* | (2018.01) |

(52) U.S. Cl.
CPC ............ *B01D 45/08* (2013.01); *B01D 45/10* (2013.01); *B01D 45/16* (2013.01); *B01D 46/10* (2013.01); *B05B 14/44* (2018.02); *Y10S 55/46* (2013.01)

(58) Field of Classification Search
CPC ........ B01D 45/08; B01D 46/10; B01D 45/10; B01D 45/16; Y10S 55/46; B05B 14/44
See application file for complete search history.

(56) References Cited

U.S. PATENT DOCUMENTS

| 1,603,878 A | | 10/1926 | Smith | |
|---|---|---|---|---|
| 2,387,473 A | * | 10/1945 | Spitzka | F24F 5/0035 96/233 |
| 2,439,536 A | | 4/1948 | Worthen et al. | |
| 2,939,545 A | | 6/1960 | Silverman | |
| 3,616,744 A | * | 11/1971 | Jensen | F24C 15/20 126/299 E |
| 3,771,430 A | | 11/1973 | Lane | |
| 3,802,158 A | | 4/1974 | Ohle | |
| 3,853,514 A | * | 12/1974 | Post | B01D 45/08 96/230 |
| 3,932,151 A | | 1/1976 | Lau | |
| 3,955,949 A | | 5/1976 | Rohrer | |
| 4,158,449 A | * | 6/1979 | Sun | B01D 46/10 244/136 |
| 4,175,938 A | | 11/1979 | Regehr | |

(Continued)

OTHER PUBLICATIONS

In Gyou Min; International Search Report of PCT International Application # PCT/US2019/037643, dated Oct. 4, 2019 by ISA/KR, KIPO, Daejeon, Republic of Korea.

*Primary Examiner* — Dung H Bui
(74) *Attorney, Agent, or Firm* — Babcock IP, PLLC (57) ABSTRACT

A particle separator is provided with a passage with a plurality of baffles arranged extending from a top plate through a bottom surface; the baffles spaced to define a sinuous flow path therebetween from an inlet side to an outlet side. Each of the baffles provided with a cavity area open to the inlet side, the cavity area extending longitudinally along the baffles and through the bottom surface; the baffles provided in rows, successive rows offset horizontally to align an interval between the baffles in each of the rows with the cavity of the baffles of the next row. The baffles retractable out of the passage, through the top plate.

18 Claims, 11 Drawing Sheets

(56) References Cited

U.S. PATENT DOCUMENTS

| | | | |
|---|---|---|---|
| 4,276,064 A | 6/1981 | Gerdes | |
| 4,281,635 A * | 8/1981 | Gaylord | F24C 15/20 |
| | | | 126/299 D |
| 4,283,209 A | 8/1981 | Schmalhofer | |
| 4,321,064 A | 3/1982 | Vargo | |
| 4,475,447 A | 10/1984 | Kock | |
| 4,823,549 A | 4/1989 | Moser | |
| 4,874,412 A | 10/1989 | Nowack | |
| 4,897,095 A | 1/1990 | Bedi | |
| 4,955,990 A | 9/1990 | Napadow | |
| 4,992,085 A | 2/1991 | Belin et al. | |
| 5,250,090 A | 10/1993 | Vandervort | |
| 5,268,011 A | 12/1993 | Wurz | |
| 5,352,257 A | 10/1994 | Powers | |
| 6,017,377 A | 1/2000 | Brown | |
| 6,110,247 A * | 8/2000 | Birmingham | B01D 45/08 |
| | | | 55/442 |
| 6,120,573 A | 9/2000 | Call et al. | |
| 6,125,841 A * | 10/2000 | Boudreault | B08B 9/00 |
| | | | 126/299 D |
| 6,290,742 B1 | 9/2001 | Pakkala | |
| 6,312,504 B1 * | 11/2001 | Both | B01D 45/08 |
| | | | 55/385.5 |
| 7,001,338 B2 | 2/2006 | Hayek | |
| 7,004,998 B2 | 2/2006 | Scherrer | |
| 7,537,627 B2 | 5/2009 | Scherrer | |
| 7,601,193 B2 | 10/2009 | Scherrer | |
| 7,618,472 B2 | 11/2009 | Agnello | |
| 7,686,862 B1 | 3/2010 | Daniel | |
| 7,947,123 B2 | 5/2011 | Kwok | |
| 8,216,331 B2 | 7/2012 | Müller | |
| 8,734,053 B1 | 5/2014 | Sackett | |
| 8,961,667 B2 | 2/2015 | McCutchen | |
| 2004/0118285 A1 * | 6/2004 | Kim | A61L 9/16 |
| | | | 96/55 |
| 2004/0182055 A1 * | 9/2004 | Wynn | B01D 46/0001 |
| | | | 55/497 |
| 2009/0194093 A1 * | 8/2009 | Aviles | B01D 45/06 |
| | | | 126/299 E |
| 2015/0128543 A1 * | 5/2015 | Piszczek | B01D 45/16 |
| | | | 55/440 |
| 2018/0126318 A1 * | 5/2018 | Schubert | B01D 45/08 |
| 2019/0111375 A1 * | 4/2019 | Chen | B04C 9/00 |

\* cited by examiner

SINUOUS PATH INERTIAL PARTICLE SEPARATOR SYSTEM AND METHOD

BACKGROUND

Field of the Invention

The invention relates to a system and method for separating particles from a gaseous stream, and more particularly a system and method utilizing a sinuous path through a baffle array for inertial particle separation and collection.

Description of Related Art

Conventional systems for separation of particles from gaseous streams typically utilize large cyclone assemblies, cartridge and/or bag filter arrays.

Cyclone assemblies and their associated ductwork for routing the gaseous stream to and from the cyclone may require significant capital investment and floorspace. Further, where the particles within the gaseous stream vary depending upon production mode/color applied and it is desired to separately collect each particle type, a cyclone assembly may have far too large a surface area to make cleaning between production runs to eliminate recovered particle cross-contamination cost and/or time efficient.

Filter arrays, such as a plurality of filter bags in a baghouse, may filter gaseous streams with a high degree of particle capture but require a significant ongoing operating cost as each filter bag/cartridge is replaced when eventually fouled by the particulates. Further, exchanging between filtering of different gaseous streams for particulate recovery is also labor-intensive and time-consuming. Finally, where the gaseous stream is hot and/or includes burning embers or cinders, prohibitively expensive fireproof filter media may be required.

Competition in the gaseous stream particle recovery industry has focused attention on process flexibility, quality control, labor requirements and overall reductions in manufacturing and installation costs.

Therefore, it is an object of the invention to provide a system and methods that overcome deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

The inventor has recognized that the prior particulate recovery systems are unnecessarily complex, inefficient and inflexible.

Figure 1:
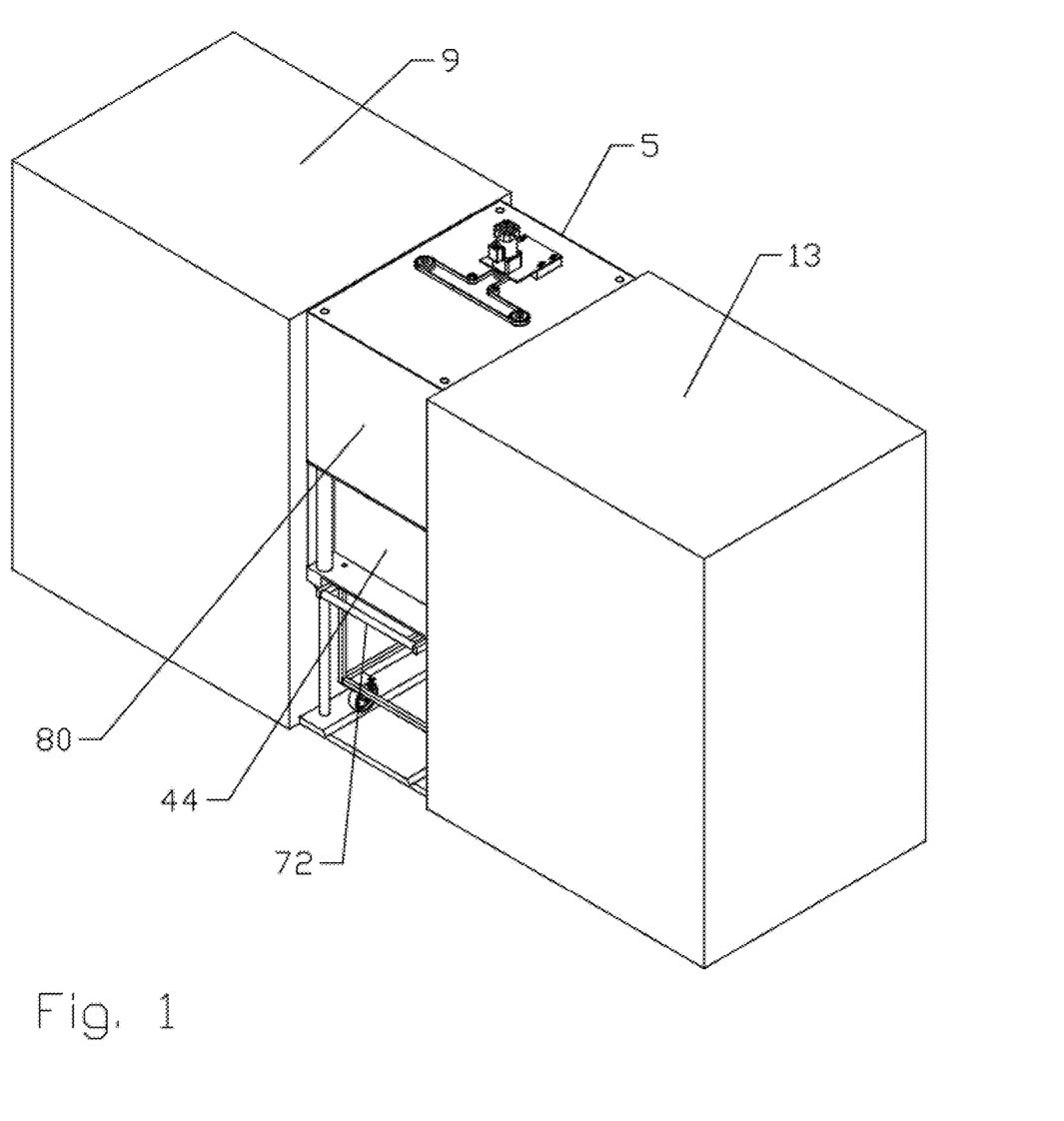
FIG. 1 is a schematic isometric view of an exemplary inertial separation system.

As shown for example in FIG. 1, a sinuous path inertial separation system (SPIS) 5 is positioned between a gaseous particle stream source 9 and a final filtration/fan module 13. Drawn through the SPIS 5 by, for example, a fan of the final filtration/fan module 13, the gaseous particle stream passes through a baffle array 17 of the SPIS 5 formed by a plurality of baffles 20 arranged in generally vertical staggered rows.

Figure 2:
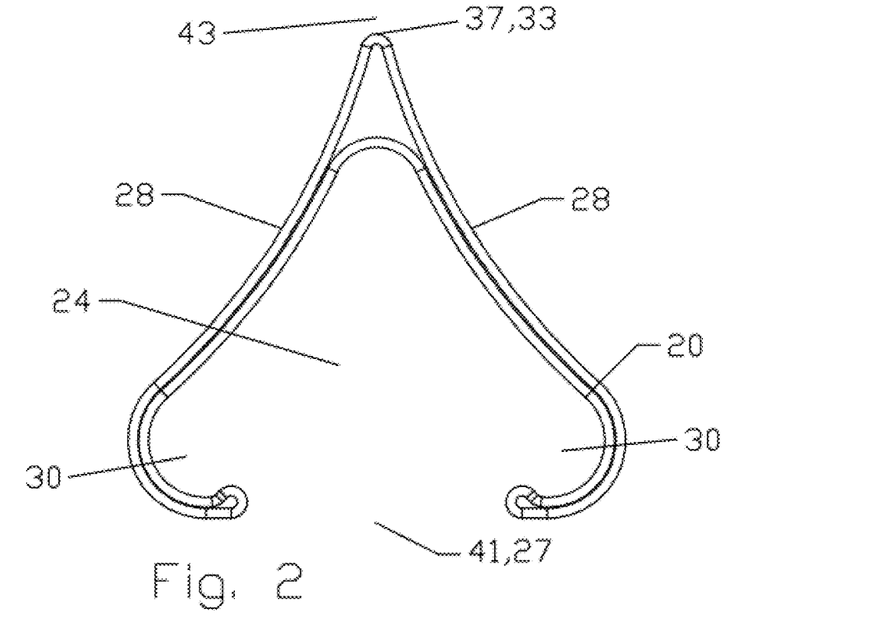
FIG. 2 is a schematic top view of an exemplary baffle.
Figure 3:
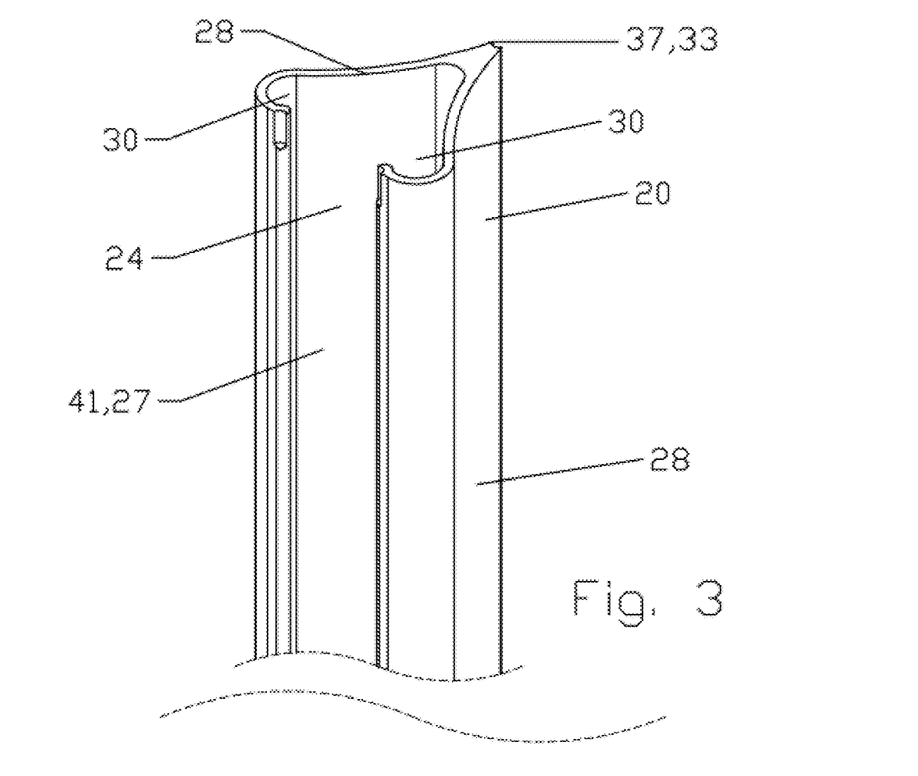
FIG. 3 is a schematic isometric view of a top section of the baffle of FIG. 2.

As best shown in FIGS. 2 and 3, each of the baffles 20 have a flattened teardrop cross-section provided with a cavity area 24 open to a front face 27. The cavity area 24 extends longitudinally and includes rounded side pockets 30 positioned at opposing sides proximate the front face 27. The back face 33 tapers to form a tail 37. Sidewalls of each baffle 20, between the front face 27 and the back face 33 may have an exterior side surface 28 that is concave. The baffle 20 cross-section may be adjusted wider or narrower and the cavity area 24 (and side pockets 30) shortened or extended according to the volume and characteristics of the particles to be collected. One skilled in the art will appreciate that the baffles 20 may be cost efficiently fabricated with a high degree of dimensional precision by extrusion in either polymer or metal alloy materials according to, for example, a temperature and/or abrasive characteristic of the particles. Alternatively, the baffles 20 may be formed via sheet-metal bending.

Figure 4:
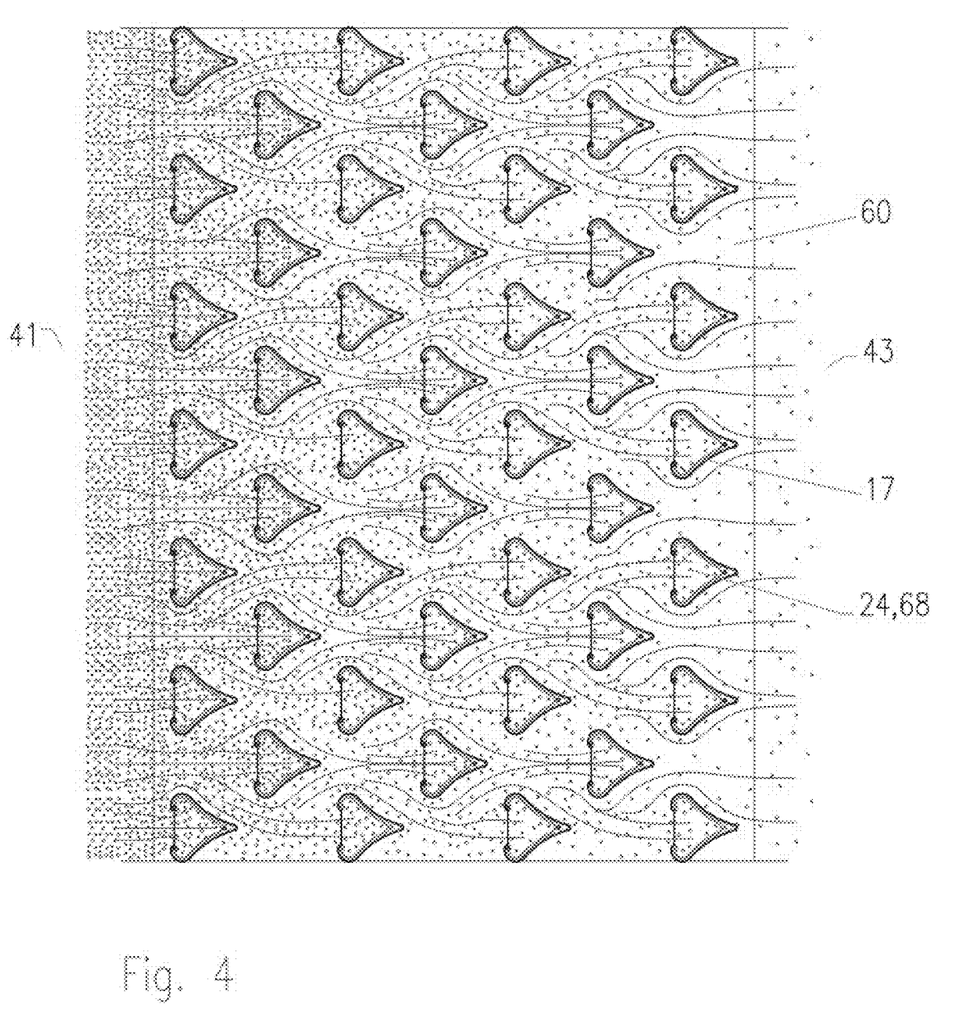
FIG. 4 is a schematic top view of a passage with baffle array, demonstrating particle capture within the cavity areas as a gaseous particle stream passes the baffle array.

As shown in FIG. 4, during operation the gaseous particle stream passes along the passage 42 from an inlet side 41 to an outlet side 43 through the baffle array 17. The gaseous particle stream is forced by the presence of the staggered rows of baffles 20 to move along a sinuous path. As the particles are each significantly heavier than the gaseous stream carrying them along, with each direction change around the individual baffles 20, inertia will have a greater effect upon the individual particles, inducing them to travel linearly rather than turning, resulting in capture of the particles within the cavity area 24 of the individual baffles 20 the gaseous stream is passing around. Once captured within a cavity area 24, a particle is inhibited from exiting the cavity area 24 by swirling turbulence there within aided by the rounded side pockets 30. Contained within the cavity area 24 the particles will travel downward under the influence of gravity.

Figure 5:
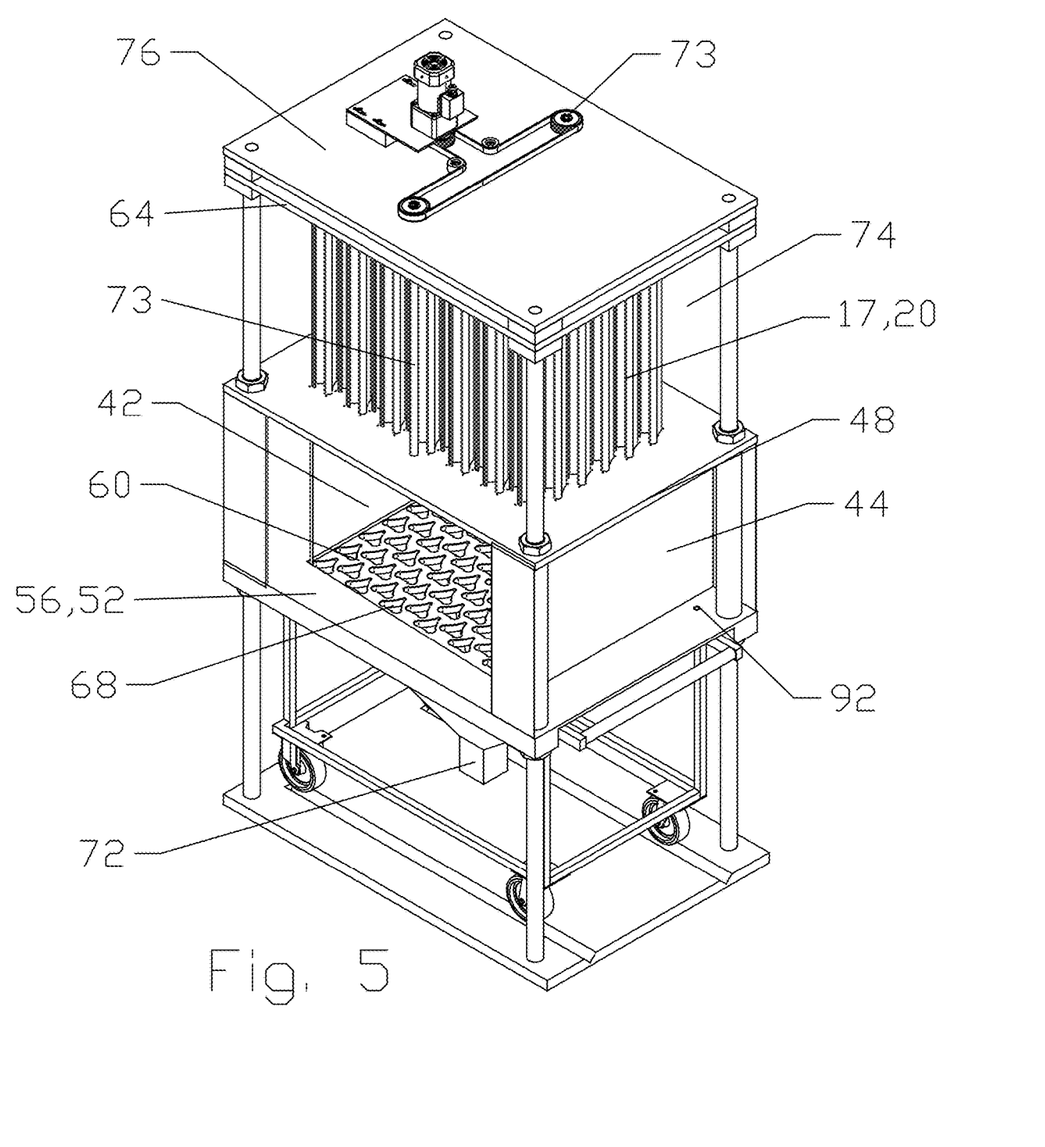
FIG. 5 is a schematic isometric view of an exemplary sinuous path inertial separation system, with baffle array retracted and shroud removed.
Figure 6:
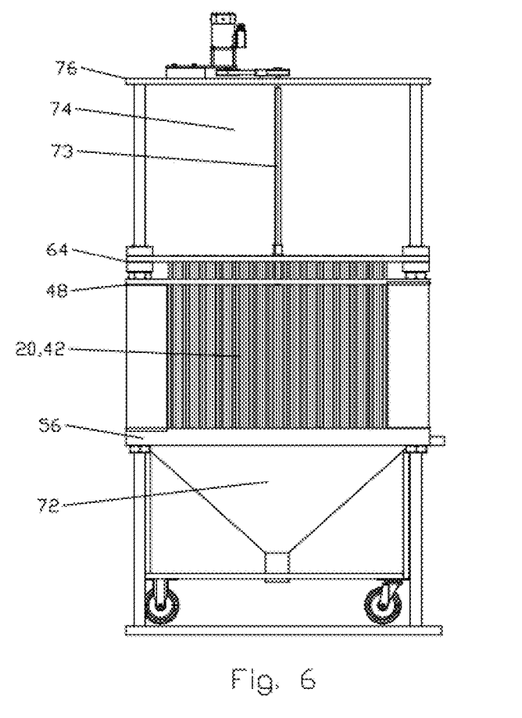
FIG. 6 is a schematic side view of the SPIS of FIG. 5, with the baffle array inserted into the passageway.
Figure 7:
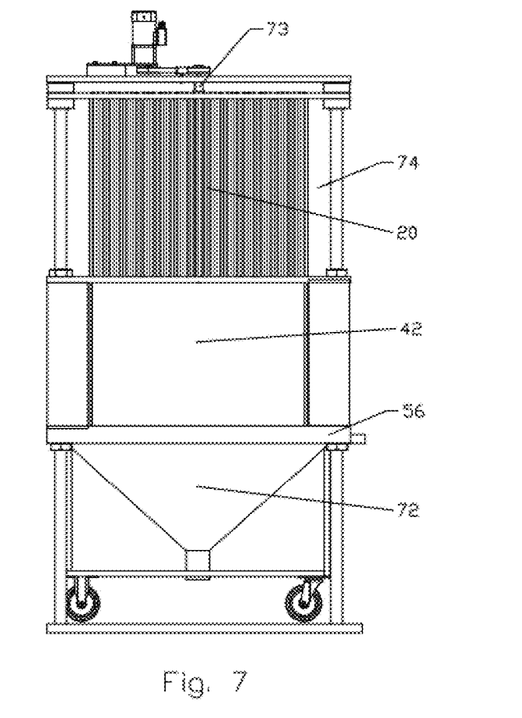
FIG. 7 is a schematic side view of the SPIS of FIG. 5, with the baffle array retracted from the passageway.

As best shown in FIGS. 5-7, the gaseous particle stream is guided across the baffle array 17 by a passage 42 formed by side panels 44, a top plate 48 and a bottom surface 52 here demonstrated comprising a horseshoe plate 56 and a hopper cover 60.

Figures 8, 9, 10:
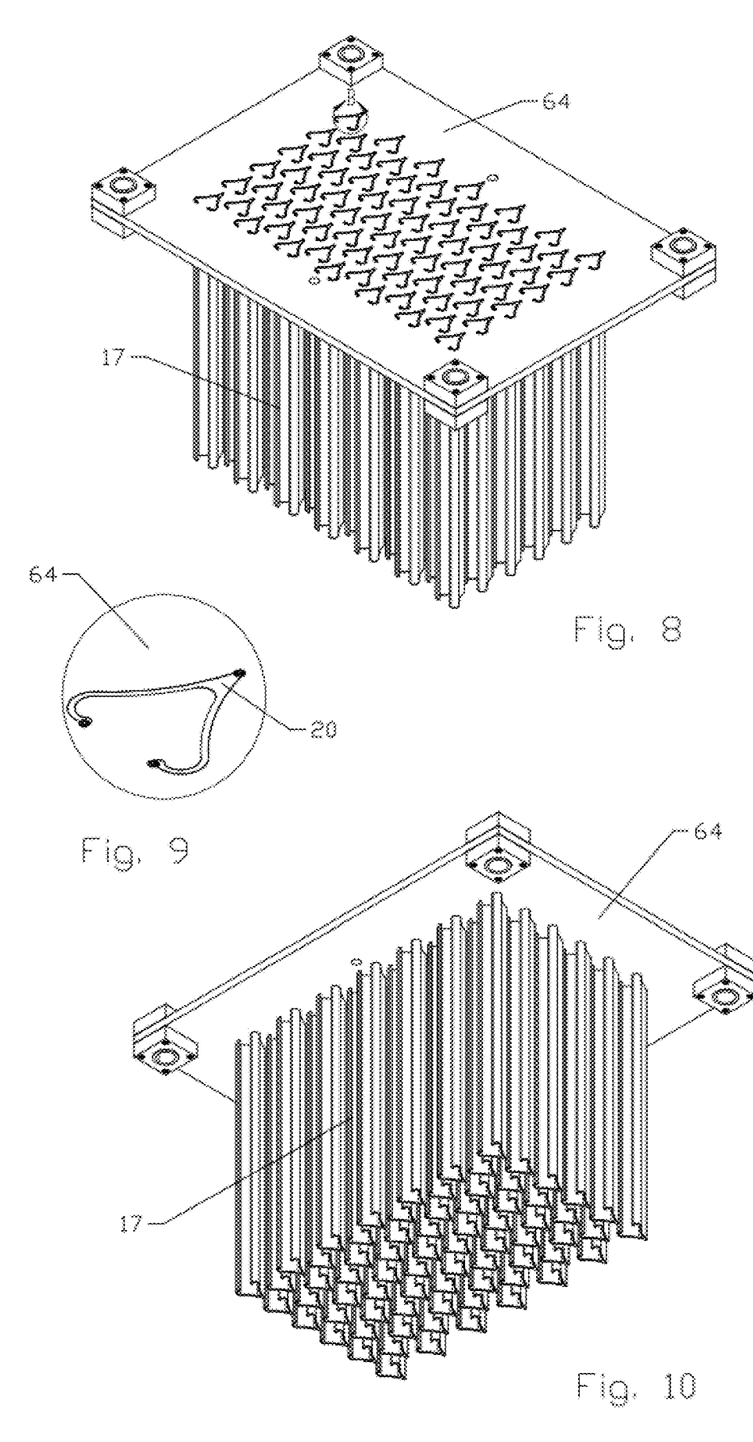
FIG. 8 is a schematic isometric top view of a baffle plate with baffle array attached.
FIG. 9 is a close-up view of area B of FIG. 8.
FIG. 10 is a schematic isometric bottom view of the baffle plate and baffle array of FIG. 8.

The individual baffles 20 may each be mounted to a baffle plate 64 (see FIGS. 8-10), for example via screws, configured so that the baffle array 17 may be raised and lowered through corresponding cutouts provided in the top plate 48 into and out of the passage 42. When seated within the passage 42 the distal ends of the individual baffles 20 extend through collection holes 68 provided in the hopper cover 60. A longitudinal axis of each of the baffles 20 may be perpendicular to a plane of the bottom surface 52. Thus, each of the collection holes 68 enables the particles falling along the cavity area 24 of the corresponding baffle 20 under the influence of gravity to exit the passage 42 and collect within the hopper 72.

The movable baffle plate 64, driven for example by rotatable threaded rods 73 suspended from a drive plate 76, facilitates cleaning of the baffle array 17 and passage 42 after extended run time and/or upon gaseous stream changeover to enable collection of different particle types without cross-contamination such as color changes, for example when the gaseous particle stream source 9 is a collection area for overspray from a spray booth for a powder coating line.

Figure 11:
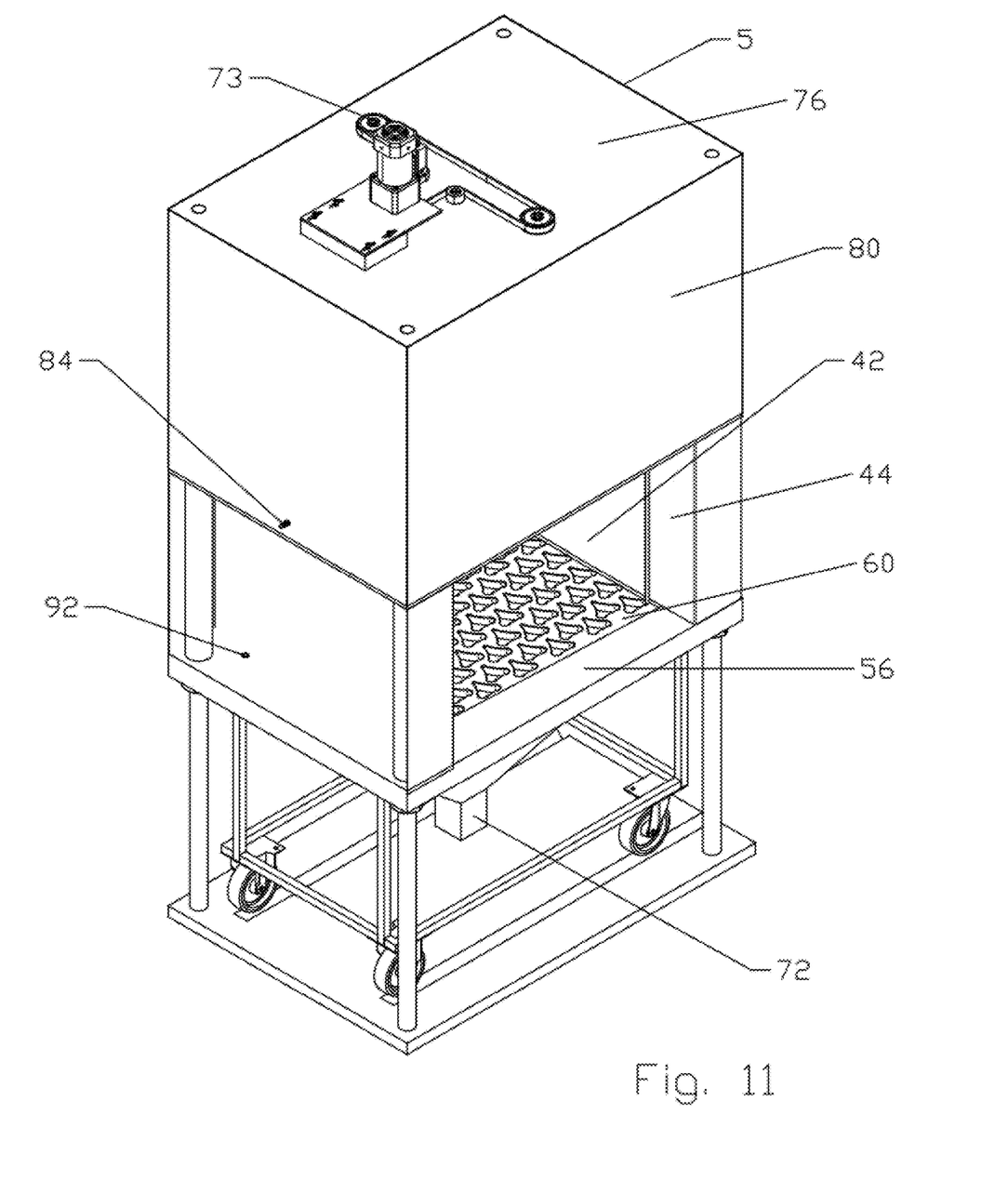
FIG. 11 is a schematic isometric view of a SPIS, with the shroud in place.

As best shown in FIG. 11, the displacement area 74 (see FIGS. 5-7) between the top plate 48 and drive plate 76 through which the baffle plate 64 reciprocates up and down is enclosed by a shroud 80 provided with an air inlet 84. Thereby the displacement area 74 may be pressurized to a higher level than that of the passageway 42 to provide an air curtain between the displacement area 74 and the passageway 42 during operation to inhibit passage of particles into the displacement area 74.

Figure 12:
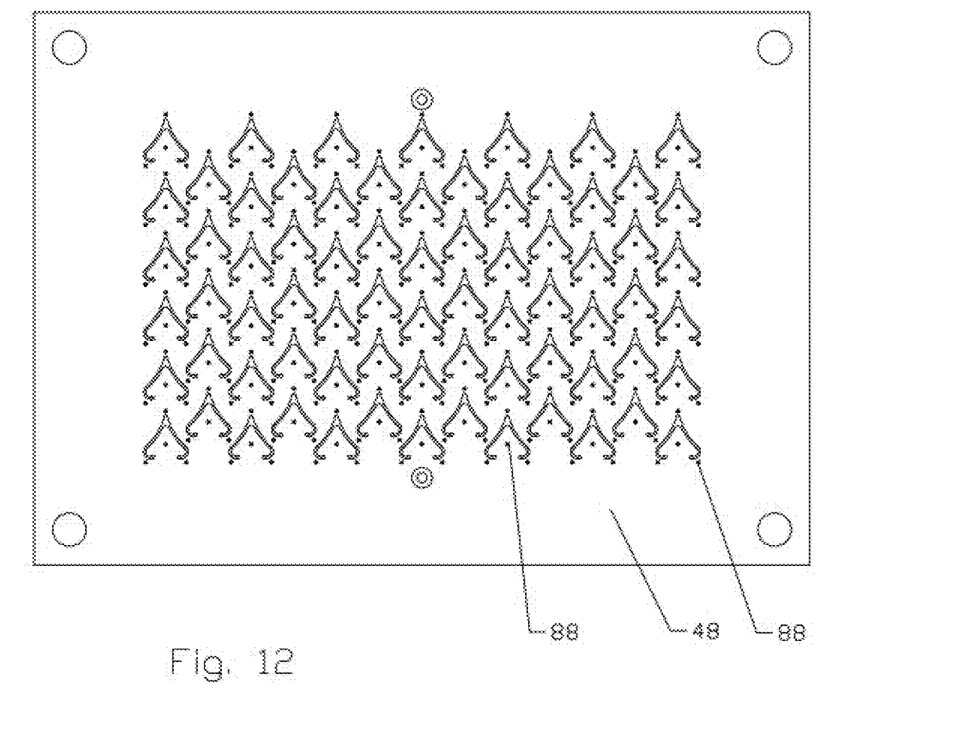
FIG. 12 is a schematic top view of a top plate.

During changeover and/or cleaning operations, the displacement area 74 may be significantly over pressurized such that an airstream escaping from the displacement area 74 between the baffles 17 and top plate 48 washes the exterior surfaces of each baffle 20 as the baffle array 17 is retracted through the top plate 48. As best shown in FIG. 12, additional wash holes 88 may be applied to the top plate 48 areas corresponding to the cavity area 24 and/or periphery of each baffle 17 to provide additional airflow at areas of the baffle array 17 with expected particle buildup.

Figure 13:
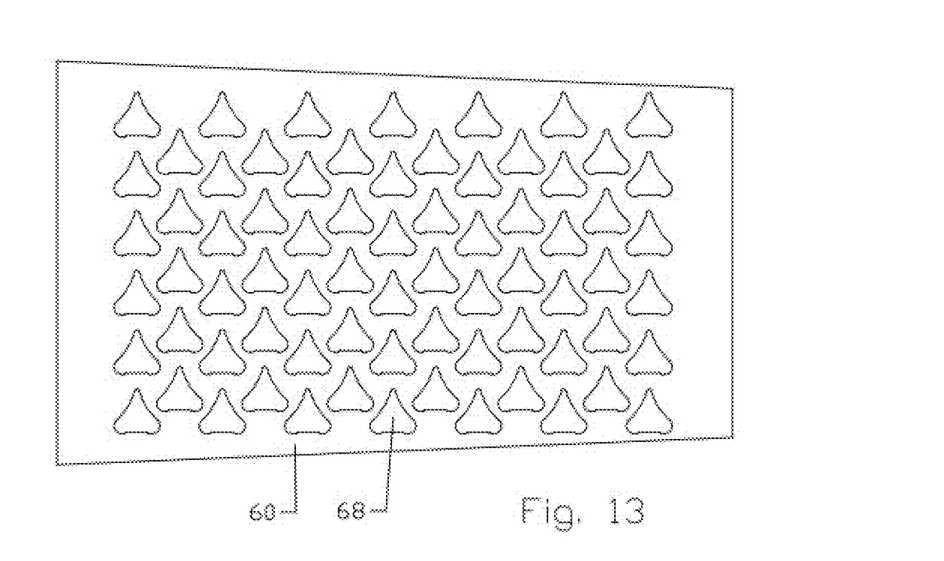
FIG. 13 is a schematic top view of a hopper cover.
Figure 14:
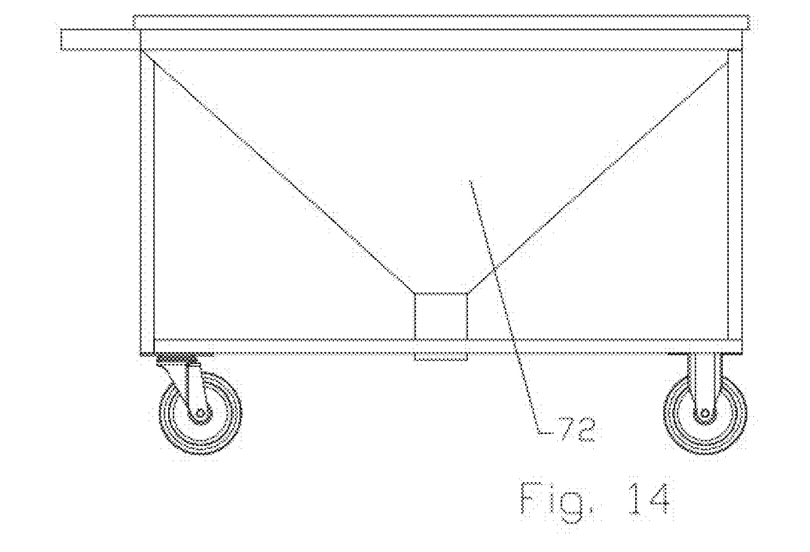
FIG. 14 is a schematic side view of a hopper.
Figure 15:
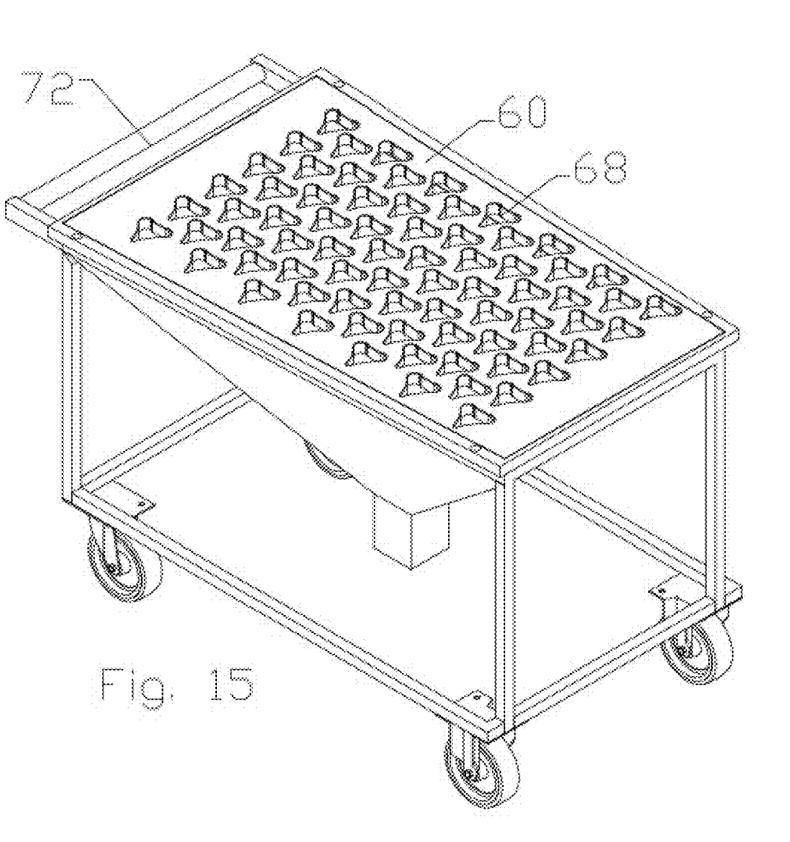
FIG. 15 is a schematic isometric top view of the hopper of FIG. 14.

The hopper plate 60 and collection holes 68 may be withdrawn from the passage 42 with the hopper 72 (see FIGS. 13-15), enabling quick exchange of these surfaces for cleaning separate from the downtime of the SPIS 5 or dedication of a separate hopper 72 for each particle type/color.

Figure 16:
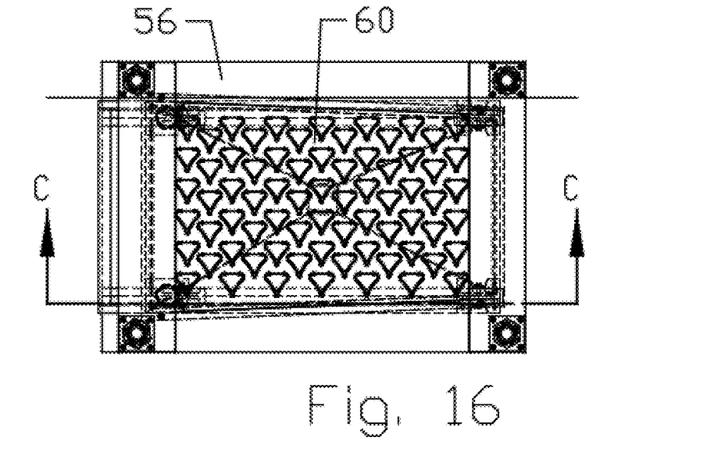
FIG. 16 is a schematic top view of a SPIS, top assemblies removed for clarity.
Figure 17:
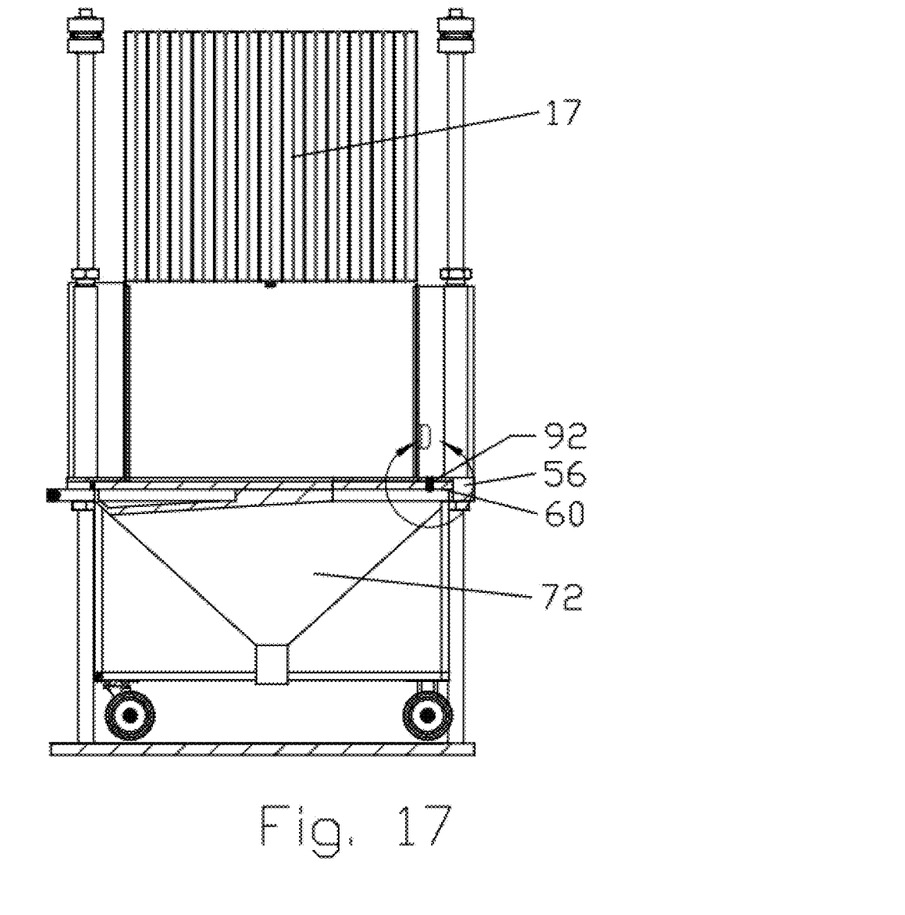
FIG. 17 is a schematic side cutaway view of the SPIS of FIG. 16, taken along line CC.
Figure 18:
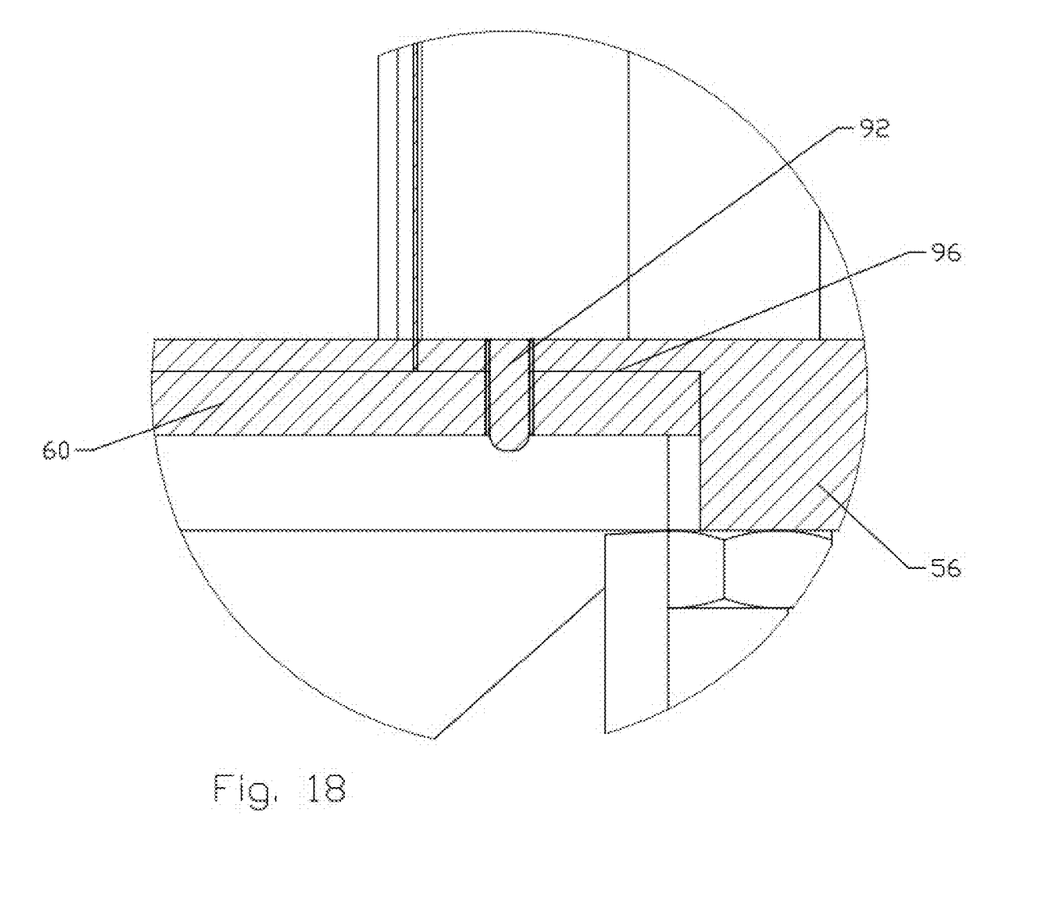
FIG. 18 is a close-up view of area D of FIG. 17.

As best shown in FIGS. 16-18, the hopper 72 may be configured to seal against the horseshoe plate 56 first roughly via a wedge shape of the hopper 72 into the horseshoe plate 56 and then with precision against tapered guide pins 92 as the hopper 72 is lifted into operating position such that the hopper 72 seats against a shoulder 96 of the horseshoe plate 56.

One skilled in the art will appreciate that SPIS 5 enables particle recovery from gaseous streams with both extended run times and quick changeover for different particle recovery with a low chance for cross particle contamination in a compact and cost-efficient system. Further, the SPIS 5 is usable with high temperature gaseous streams as the surfaces in contact with the gaseous stream may be entirely metallic.

| Table of Parts | |
|---|---|
| 5 | sinuous path inertial separation system |
| 9 | gaseous particle stream source |
| 13 | final filtration/fan module |
| 17 | baffle array |
| 20 | baffle |
| 24 | cavity area |
| 27 | front face |
| 28 | side surface |
| 30 | side pocket |
| 33 | back face |
| 37 | tail |
| 41 | inlet side |
| 42 | passage |
| 43 | outlet side |
| 44 | side panel |
| 48 | top plate |
| 52 | bottom surface |
| 56 | horseshoe plate |
| 60 | hopper cover |
| 64 | baffle plate |
| 68 | collection hole |
| 72 | hopper |
| 73 | threaded rod |
| 74 | displacement area |
| 76 | drive plate |
| 80 | shroud |
| 84 | air inlet |
| 88 | wash hole |
| 92 | guide pin |
| 96 | shoulder |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. A particle separator, comprising:
    a passage with a plurality of baffles arranged extending from a top plate through a bottom surface; the baffles spaced to define a flow path therebetween from an inlet side to an outlet side;
    each of the baffles provided with a cavity area open to the inlet side, the cavity area extending longitudinally along the baffles and through the bottom surface; the baffles provided in rows, successive rows offset horizontally to align an interval between the baffles in each of the rows with the cavity of the baffles of the next row;
    the baffles are each coupled to a baffle plate, the baffle plate movable toward and away the from the top plate to retract the baffles from the passage, through the top plate; and
    a hopper coupled to the bottom surface.

2. The particle separator of claim 1, wherein the baffles extend through the bottom into the hopper.

3. The particle separator of claim 1, wherein there are at least three rows.

4. The particle separator of claim 1, further including at least one wash hole provided in the top plate, the wash hole arranged to spray the cavity area of one of the baffles as the baffle is retracted from the passage.

5. The particle separator of claim 1, wherein the bottom surface is a hopper cover of the hopper, the hopper cover provided with a collection hole for each baffle to extend through, the hopper removable from the particle separator.

6. The particle separator of claim 1, wherein the baffle plate is movable within a displacement area between the top plate and a drive plate, the displacement area enclosed by the top plate, drive plate and a shroud.

7. The particle separator of claim 6, wherein the displacement area is pressurizable to a higher pressure than the passage.

8. The particle separator of claim 1, wherein the movement of the baffle plate is driven via threaded rods mounted between the top plate and the drive plate.

9. The particle separator of claim 1, wherein a horizontal cross-section of the flow path is sinuous.

10. The particle separator of claim 1, wherein a longitudinal axis of each of the plurality of baffles is perpendicular to a plane of the bottom surface.

11. The particle separator of claim 1, wherein a cross-section of each of the baffles has a front face with the cavity area and two side pockets extending from the front face at opposing sides of the cavity area, and a back face which tapers to a tail.

12. The particle separator of claim 11, wherein an exterior side surface between the front face and the back face of the baffles is concave.

13. A method for exchanging between filtration of different particle streams, comprising:

providing a particle separator according to claim 1;
stopping a particulate stream along the flow path;
spraying the cavity area of each baffle while retracting the baffles out of the passage;
spraying the passage while the baffles are retracted;
returning the baffles into the passage;
initiating another particulate stream along the flow path.

14. The method of claim 13, wherein the spraying of the cavity areas is provided by an air wash along the baffles as the baffles are retracted through a top plate, a displacement area on one side of the top plate provided at a higher pressure than the passage on the other side of the top plate.

15. The method of claim 13, further including a plurality of wash holes in the top plate arranged proximate each baffle.

16. The method of claim 13, further including exchanging the hopper.

17. A method for manufacturing a particle separator comprising:

providing a passage with a plurality of baffles arranged extending from a top plate through a bottom surface; the baffles spaced to define a flow path therebetween from an inlet side to an outlet side;
each of the baffles provided with a cavity area open to the inlet side, the cavity area extending longitudinally along the baffles and through the bottom surface; the baffles provided in rows, successive rows offset horizontally to align an interval between the baffles in each of the rows with the cavity of the baffles of the next row;
configuring the baffles each coupled to a baffle plate, the baffle plate movable toward and away the from the top plate to retract the baffles from the passage, through the top plate; and
providing a hopper coupled to the bottom surface.

18. The method of claim 17, wherein the baffles are formed via extrusion.

* * * * *